United States Patent
Griffin et al.

(10) Patent No.: US 11,444,773 B1
(45) Date of Patent: Sep. 13, 2022

(54) BIOMETRIC REFERENCE TEMPLATE RECORD

(71) Applicant: Wells Fargo Bank, N.A., San Francisco, CA (US)

(72) Inventors: Phillip H. Griffin, Raleigh, NC (US); Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 83 days.

(21) Appl. No.: 17/011,351

(22) Filed: Sep. 3, 2020

Related U.S. Application Data

(63) Continuation of application No. 16/171,065, filed on Oct. 25, 2018, now Pat. No. 10,778,676, which is a continuation of application No. 15/188,685, filed on Jun. 21, 2016, now Pat. No. 10,142,333.

(51) Int. Cl.
*H04L 9/32* (2006.01)
*H04L 9/40* (2022.01)
*G06F 21/32* (2013.01)

(52) U.S. Cl.
CPC ............ *H04L 9/3231* (2013.01); *G06F 21/32* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 7,941,668 B2 | 5/2011 | Stapleton et al. |
| 8,289,135 B2 | 10/2012 | Griffin |
| 8,301,902 B2 | 10/2012 | Griffin |
| 8,327,134 B2 | 12/2012 | Griffin |
| 8,359,475 B2 | 1/2013 | Griffin |

(Continued)

OTHER PUBLICATIONS

American National Standard for Financial Services, "ANSI X9.119-2016, Retail Financial Services, Requirements for Protection of Sensitive Payment Card Data, Part 2: Implementing Post-Authorization Tokenization Systems", 2016. 67 pages.

(Continued)

*Primary Examiner* — Benjamin E Lanier
(74) *Attorney, Agent, or Firm* — Foley & Lardner LLP

(57) ABSTRACT

Systems and methods provide for secure and efficient token generation, management, transfer, and authentication services in a biometric data environment. Various embodiments relate to a method performed by a processor of an authentication computing system. An example method includes receiving an update biometric reference sample and a user identifier, retrieving a previous biometric reference template record in a storage location based on the user identifier. The previous biometric reference template record includes a template record identifier uniquely identifying the previous biometric reference template record and a previous biometric reference template generated using a previous biometric reference sample. The method further includes comparing the update biometric reference sample to the previous biometric reference template and, if a biometric data type of the update biometric reference sample is different than that of the previous biometric reference template, generating an update biometric reference template.

16 Claims, 7 Drawing Sheets

(56) References Cited

U.S. PATENT DOCUMENTS

| | | |
|---|---|---|
| 8,508,339 B2 | 8/2013 | Griffin |
| 8,700,909 B2 | 4/2014 | Griffin |
| 8,756,416 B2 | 6/2014 | Griffin |
| 8,782,397 B2 | 7/2014 | Arnold et al. |
| 10,142,333 B1 | 11/2018 | Griffin et al. |
| 2004/0010697 A1 | 1/2004 | White |
| 2004/0187037 A1* | 9/2004 | Checco .................. G06F 21/32 726/7 |
| 2005/0229007 A1 | 10/2005 | Bolle et al. |
| 2006/0239511 A1 | 10/2006 | White et al. |
| 2007/0283165 A1 | 12/2007 | Milgramm et al. |
| 2009/0116703 A1 | 5/2009 | Schultz |
| 2009/0164796 A1 | 6/2009 | Peirce |
| 2010/0205431 A1 | 8/2010 | Griffin |
| 2011/0126280 A1 | 5/2011 | Asano |
| 2011/0138187 A1 | 6/2011 | Kaga et al. |
| 2012/0004029 A1* | 1/2012 | Morrow ................. G07F 17/32 463/29 |
| 2012/0167183 A1 | 6/2012 | Langley |
| 2014/0149747 A1 | 5/2014 | Bowers |
| 2015/0082390 A1 | 3/2015 | Flink |
| 2016/0203496 A1 | 7/2016 | Guerrero et al. |
| 2016/0300234 A1 | 10/2016 | Moss-Pultz et al. |
| 2016/0323273 A1 | 11/2016 | Aufderheide, Jr. et al. |
| 2016/0330027 A1 | 11/2016 | Ebrahimi |

OTHER PUBLICATIONS

American National Standard for Financial Services, "Biometric Information Management and Security for Financial Services Industry", ANSI X9.84-2010, Mar. 31, 2010. 172 pages.

American National Standard for Financial Services, "Cryptographic Message Syntax ASN.1 and XML", ANSI X9.73-2010, Apr. 15, 2010. 89 pages.

Griffin, Phillip H., "Telebiometric Authentication Objects", Complex Adaptive Systems, Publication 4, Procedia Computer Science, 36, pp. 393-400, 2014. 8 pages.

International Telecommunication Union, "Series X: Data Networks, Open Security Communications and Security, OSI networking and system aspects—Naming, Addressing and Registration", X.660, Jul. 2011. 32 pages.

* cited by examiner

BIOMETRIC REFERENCE TEMPLATE RECORD

CROSS-REFERENCE TO RELATED APPLICATIONS

The present application is a Continuation of U.S. patent application Ser. No. 16/171,065 titled "BIOMETRIC REFERENCE TEMPLATE RECORD," filed Oct. 25, 2018, which itself is a Continuation of U.S. patent application Ser. No. 15/188,685 titled "BIOMETRIC REFERENCE TEMPLATE RECORD," filed Jun. 21, 2016, both of which are incorporated herein by reference in their entireties and for all purposes.

BACKGROUND

Biometric technology is used to confirm the identity of an individual to provide secure access to electronic systems (e.g., to perform financial transactions). After an individual enrolls in a biometric service (e.g., provides biometric data and a non-biometric means of confirming an identity), the individual can be authenticated via the biometric service. Biometric authentication (i.e., identification and validation) leverages the universally recognized fact that certain physiological or behavioral characteristics can reliably distinguish one person from another. Biometric technology includes both automatically collecting and comparing these characteristics. Digital representations of these characteristics are stored in an electronic medium, and later used to authenticate the identity of an individual.

SUMMARY

Various embodiments relate to a method performed by a processor of an authentication computing system. An example method includes receiving a biometric reference sample and a user identifier. The user identifier uniquely identifies a user from whom the biometric reference sample was captured. The biometric reference sample is processed to generate biometric data. The processed biometric data is tokenized using a tokenization schema. A reference template and a biometric reference template record is generated. The reference template is included in the biometric reference template record. The biometric reference template record includes a template identifier uniquely identifying the reference template. The template identifier is associated with the user identifier. The reference template further includes the tokenized biometric data, and a first identifier signifying that the biometric reference template includes tokenized biometric data.

Various other embodiments relate to an authentication computing system. An example system includes a database of a plurality of biometric reference template records containing tokenized biometric data and processor and instructions stored in non-transitory machine-readable media. The instructions are configured to cause the server system to receive a biometric reference sample and a user identifier. The user identifier uniquely identifies a user from whom the biometric reference sample was captured. The biometric reference sample is processed to generate biometric data. The biometric data is tokenized using a tokenization schema. A biometric reference template record is generated and includes a template identifier uniquely identifying biometric reference template record. The template identifier is associated with the user identifier. The biometric reference template record further includes a reference template that contains the tokenized biometric data, and a first identifier signifying that the biometric reference template record includes tokenized biometric data.

Various other embodiments relate to a method performed by a processor of an authentication system. An example method includes receiving a biometric reference sample and a user identifier. The user identifier uniquely identifies a user from whom the biometric reference sample was captured. The biometric reference sample is processed to generate biometric data. A biometric reference template is generated. The biometric reference template includes a template identifier uniquely identifying the biometric reference template. The template identifier is associated with the user identifier. The biometric reference template also includes the biometric data. The biometric reference template is tokenized using a tokenization schema.

Various embodiments relate to a method performed by a processor of an authentication computing system. An example method includes receiving a biometric reference sample and a user identifier. The user identifier uniquely identifies a user from whom the biometric reference sample was captured. The biometric reference sample is processed to generate biometric data. The processed biometric data is tokenized using a tokenization schema. A reference template is generated and published onto a public repository. A pointer (e.g., in the form of a URI) is generated and relate to the location of the user's reference template. The pointer can be used by the user for subsequent identity verification.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
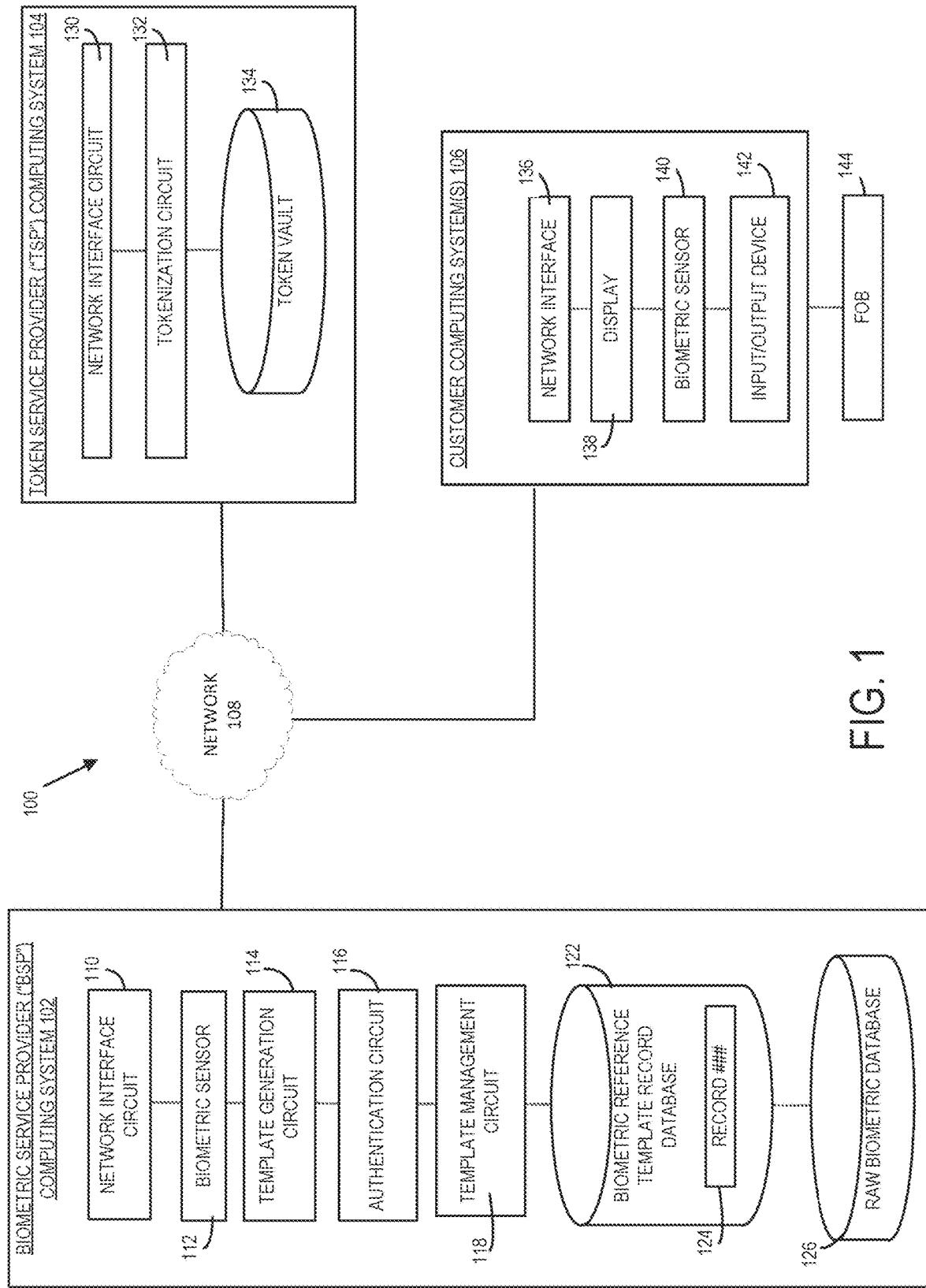
FIG. 1 is a schematic diagram of a biometric authentication system, according to an example embodiment.

Biometrics can be used for human identification and authentication for physical and logical access. Logical access can include access to applications, services, or entitlements. Authentication systems require that the party that wishes to be authenticated has enrolled a biometric reference template at a biometric service provider ("BSP") or similar entity. A biometric reference template is a digital reference of distinct characteristics of an individual obtained by processing one or more biometric samples from the individual. Current security techniques for protecting biometric data confidentiality in biometric reference templates have considered encryption for securely transferring biometrics. Protection by encryption may be performed by a BSP that manages a store of biometric templates. Issues arise when an attacker, including an insider attacker, gains access to the BSP's store of biometric reference templates, as well as the individual users' biometric data. Currently, to protect the confidentiality of personally identifiable biometric data, symmetric key encryption can be used (e.g., as set forth in ISO 19092 and X9.84 biometric information security and management standards for financial services). However, the use of encryption requires the overhead of key management system architecture and corresponding processing requirements to meet and maintain key management requirements. In addition, once biometric data has been processed (e.g., to generate a reference template), it is not possible to reconstruct the raw biometric data from the processed sample or template. Accordingly, changes or updates to processing technology may require a user to re-enroll in the biometric service by resubmitting one or more new biometric reference samples. Additionally, use and management may be cumbersome, if not impractical, if multiple processing methods exist for a particular biometric data type.

Subsequent to enrollment, biometric reference templates are used during biometric authentication processes. Biometric authentication processes include verification and/or identification. Verification is the process of comparing a match template against a specific reference template based on a claimed identity (e.g., user ID, account number, etc.). Verification is a "one-to-one" comparison that entails comparing a match template generated from a newly captured sample with a previously generated reference template stored in a database or on an ID card. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system.

Referring generally to the figures, systems, and methods for tokenizing and storing biometric information are described herein. Embodiments relate generally to the methods and processes for generating biometric reference template records. An example biometric reference template record includes (1) identifiers (e.g., identifiers or information related to the biometric type, processing info, etc.) and (2) a reference template (which includes the processed biometric data) that is tokenized. Tokenization is a form of obfuscating the cleartext such that it is replaced with a pseudonym data element in the form of a token. Generally, the tokenization of data is processed by a tokenization service provider ("TSP"). Embodiments described herein include methods and processes for applying tokenization techniques and generating biometric reference templates that protect the confidentiality of personally-identifiable biometric data stored in a biometric reference template record that is created when a person enrolls in a biometric system. The embodiments include processes for processing and storing biometric reference template records such that the sensitive plaintext biometric data on the reference template is protected by tokenization. Various embodiments describe a process for creating a reference template that contains tokenized biometric data. Various arrangements describe a process for creating a biometric reference template record that contains a reference template, which may include tokenized biometric data. Various embodiments include digitally signing one or both of the biometric reference template record and the reference template to ensure the integrity and authenticity of origin for all information included therein. Also described is a method for retrieving the original plaintext biometric data from a token stored in a biometric reference template. Various embodiments provide a tokenization schema and system that limits the success of third-party attacks to access the biometric data of individuals via a multi-facetted authentication system.

Various embodiments include systems and methods for attaching various types of information to a biometric reference template record. For example, the information attached to a biometric reference template record may indicate the tokenization schema and specific tokenization methods applied to protect plaintext biometric data, and the process for subsequently retrieving the plaintext biometric data from the token in the reference template. For example, some embodiments utilize a globally-unique information object identifier ("OID") as specified in the ISO/IEC 9834-1 standard. In some embodiments, an OID can be used in an instance of SignedData. SignedData is a cryptographic message, defined in the X9.73 financial industry security standard, that can indicate that the type of content being signed in a message is a reference template whose biometric data element has been tokenized. Signing, e.g., via SignedData, can be performed on the reference template level or on the biometric reference template record level. This first OID alerts the cryptographic message processing tools of the need to perform subsequent token processing once the signature verification processing of the SignedData message has been completed. A second OID identifies the tokenization schema used to tokenize the reference template in the biometric reference template record. This OID can be paired with an ASN.1 "open type," which can contain any arbitrary data of any type or format needed to identify the specific tokenization method applied to the tokenized biometric data, as well as any data needed for processing the token. In other arrangements, signed attributes are used during the digital signature process in place of, or in addition to, OIDs. Signed attributes provide a means of associating arbitrary information with the biometric data in a biometric template. For example, this component may be used to carry application specific information related to use of a biometric template, such as an encrypted chip card identification number, a bank identification number and blinded customer account number, or other information related to processing the reference template. After performing the SignedData signature verification, subsequent processing allows the plaintext biometric data to be recovered from the tokenization element by a message recipient. This element can be in the form of a simple oblique value (e.g., a string of octets) or structured content that contains the tokenized biometric data value and any information needed to recover the plaintext, such as the URL address of a BSP or web service, an indication of the specific tokenization technique being used, or any other required data or authentication information. The information needed for token processing can be contained in an attribute of the SignedData message that may be cryptographically bound to the biometric reference template being signed under the same digital signature.

These embodiments abrogate the issues with the current biometric security and storage ecosystems, as the use of the specific tokenization techniques and schema protect biometric data during transfer and while at rest. The biometric authentication system, according to various embodiments, provides a more effective and efficient way to transport biometric information securely. The secure transport and protection of the biometric data is in accordance with industry standards and allows the user of the biometric authentication system to restrict access to sensitive biometric data to those with a need-to-know. The biometric reference template records can be stored, transferred, distributed, or used securely, without loss of confidentiality. Additionally, the biometric reference template records described herein resolve the issue of uncertainty of the processing information or algorithm used to generate the biometric data, allowing a biometric reference template to potentially store multiple biometric types and processing algorithms inside the biometric reference template record. The biometric authentication system allows for real-time authentication of individuals using biometrics while maintaining the security posture of the system to ensure that the biometric data is safe from man-in-the-middle attacks and data breaches.

Further, the methods and systems described herein alleviate the strain on processing power and memory components currently required to manage, store, and authenticate secure biometric data. Embodiments described herein utilize a less strenuous processing method through a specific tokenization system and do not have the overhead of meeting and maintaining key management requirements as required in current authentication systems. Processing power is alleviated by the use of OIDs and signed attributes to identify the processing algorithm used for the biometric data. For example, in some embodiments, a biometric reference template record may process two biometric data types using two different algorithms that are easily discernable through the OIDs. Therefore, the biometric authentication system reduces the processing power and memory storage requirements necessary to provide secure access to biometric data for authentication of individual requesting entities. Additionally, the biometric authentication system reduces the amount of time required to identify and reprocess biometric information stored in a biometric reference template.

In addition, methods and systems described herein improve biometric processing systems by enabling biometric processing techniques to be changed over time without requiring users to re-enroll in the service by providing new biometric samples. Typically, once biometric data has been processed (e.g., to generate a biometric reference template), it is not possible to reconstruct the raw biometric data from the processed sample or template. Various embodiments include tokenizing the raw biometric data so that the data may be securely accessed and reprocessed in accordance with new or otherwise different biometric processing techniques. Accordingly, embodiments solve technical problems related to implementing new biometric processing techniques without requiring users to submit biometric samples.

FIG. 1 is a schematic diagram of a biometric authentication system 100, according to an example embodiment. The biometric authentication system 100 includes a BSP computing system 102, a TSP computing system 104, and one or more customer computing systems 106. Each of the BSP computing system 102, the TSP computing system 104, and the customer computing systems 106 is in operative communication with the others via a network 108. The network 108 may include, for example, the Internet, cellular networks, proprietary banking networks, and the like.

Generally, the biometric authentication system 100 is used to authenticate an enrolled user (e.g., a customer, account holder of a financial institution, etc.) of a service that requires authentication. Although various embodiments are described in connection with users of financial systems, it should be understood that the systems and methods described herein may similarly be used to provide biometric authentication in any type of system, such as enterprise security and other types of systems. While the TSP computing system 104 and the BSP computing system 102 are shown as separate entities in FIG. 1, in some embodiments the BSP computing system 102 performs some of or all of the functions of the TSP computing system 104, as described herein. In some embodiments, one or both of the BSP computing system 102 and the TSP computing system 104 are managed and operated by a financial institution. However, in other embodiments, one or both of the BSP computing system 102 and the TSP computing system 104 are managed and operated by a third-party that is external to a financial institution.

The BSP computing system 102 includes a network interface circuit 110, a biometric sensor 112, a template generation circuit 114, a template management circuit 118, and a biometric reference template record database 122. The BSP computing system 102 may, for example, include one or more servers each with one or more processors configured to execute instructions stored in a memory, send and receive data stored in the memory, and perform other operations to implement the financial services described herein. The network interface circuit 110 is structured to facilitate operative communication between the BSP computing system 102 and other systems and devices over the network 108.

The biometric sensor 112 is structured to capture a biometric sample from an individual and to process the biometric sample to generate the biometric data. The biometric data may be referred to as "raw" biometric data. For example, the sensor can be structured to read a fingerprint, voice print, or other biometric marker. Generally, the biometric sensor is any device that supports the capture of biometric data. In some embodiments, the request is initiated by an employee of the BSP entering data into a computing system (e.g., an employee terminal connected to the server of the BSP) during a person-to-person interaction. For example, the user (e.g., the customer) may walk into a branch location of the BSP and initiate an enrollment request, a biometric reference template update, or a service requiring biometric authentication.

The template generation circuit 114 is structured to generate, manage, catalog, and associate a user's biometric reference template record with a user identifier. Generally, the template generation circuit 114 controls enrollment, the process through which the user's identity is bound with biometric data, and entered into the system database as a biometric reference template. To generate a biometric reference template record, the template generation circuit 114 first receives a biometric reference sample and a user identifier. The template generation circuit 114 processes the biometric reference sample to generate the biometric data. The template generation circuit 114 transmits the biometric data to the TSP computing system 104 to be tokenized. The template generation circuit 114 receives from the TSP computing system 104 a tokenized biometric data string which the template generation circuit 114 uses to generate the biometric reference template record. The biometric reference template record includes a template identifier uniquely identifying the biometric reference template, the tokenized biometric data, and a first identifier signifying that the biometric reference template includes tokenized biometric data. The template identifier is associated with the user identifier and used for locating the biometric reference template records in the database 122. In some embodiments, the template generation circuit 114 digitally signs (e.g., cryptographically binds) the reference template containing the tokenized biometric data with other information, before including it in the biometric reference template record. In other embodiments, the template generation circuit 114 digitally signs biometric reference template record including the reference template and the additional identifiers. In some arrangements, the digital signing is performed using Signed-Data cryptographic message syntax to generate a Signed-Data message and binding additional identifiers (e.g., OIDs) and other information to the biometric reference template record to create a signed message. In some embodiments, the digital signing is performed on a hash of the biometric reference template record, allowing the biometric reference template record to be authenticated with the hash while limiting processing issues.

Figure 4A:
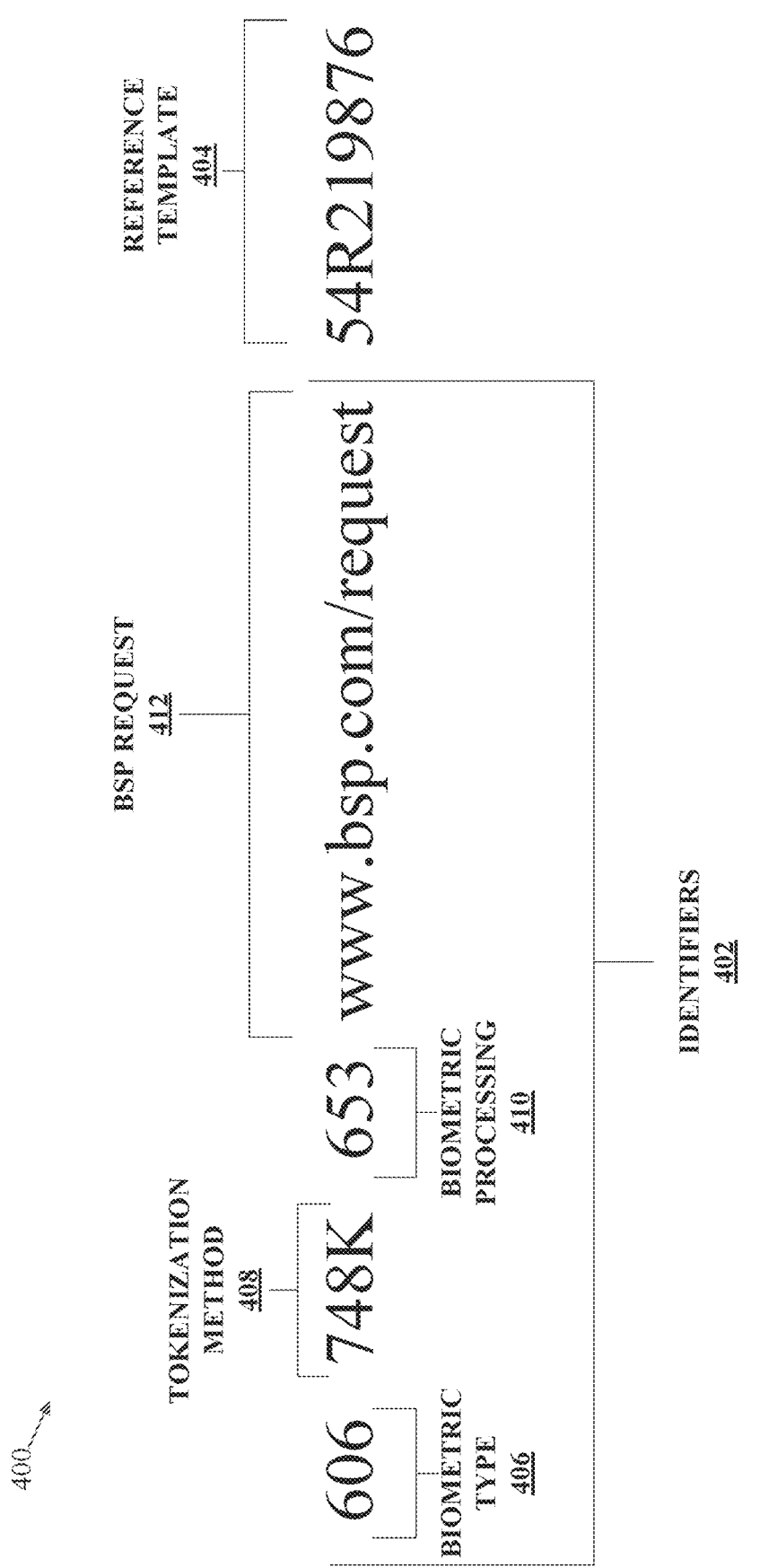
FIG. 4A is an illustration of a tokenized string of biometric data and identifiers in a biometric reference template record, according to an example embodiment.
Figure 4B:
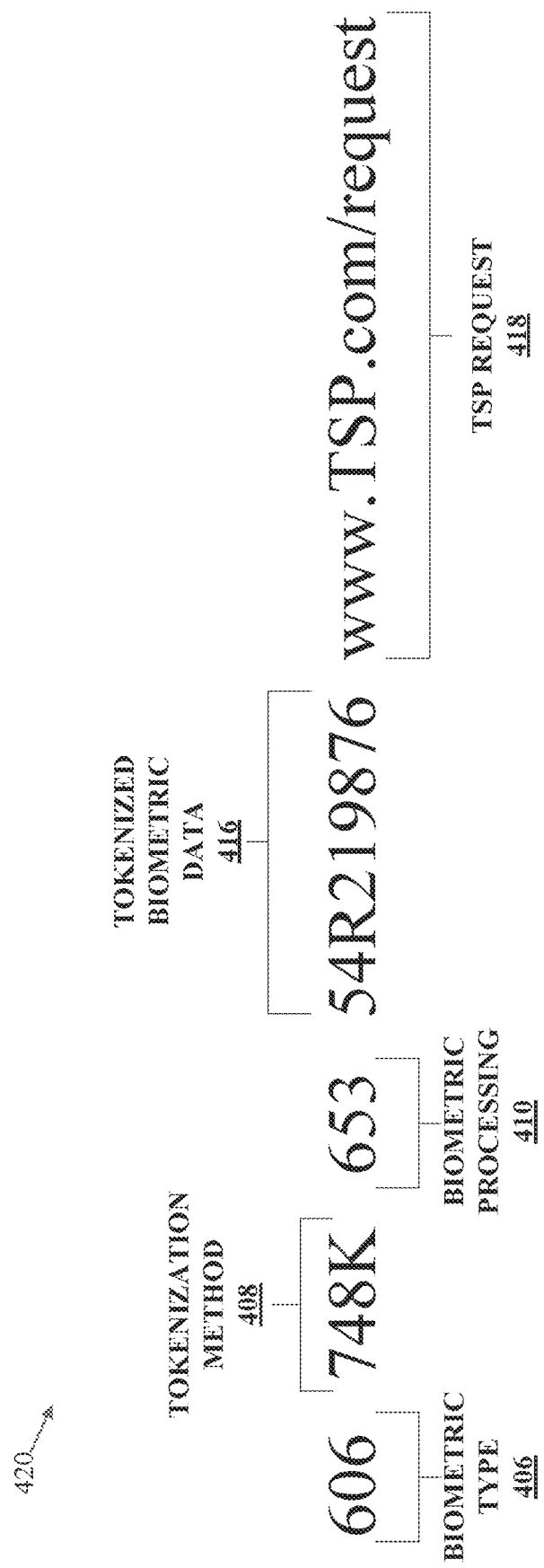
FIG. 4B is an illustration of a tokenized string of biometric data and identifiers in a reference template, according to an example embodiment.

The template generation circuit 114 is structured to add identifiers to the biometric reference template record. As previously stated, the biometric reference template record includes these identifiers and the reference template, which includes the tokenized biometric data. The identifiers are either within the biometric reference template record or associated therewith during the digital signature process. An example of this biometric reference template record is shown in FIG. 4A, containing a plurality of OIDs within a single biometric reference template record. The identifiers can be stored as one or more attributes in a digital signature bound to the biometric reference template record or a hash thereof, or stored within the biometric reference template record. The identifiers can include, for example, a uniform resource identifier ("URI") query string including a uniform resource locator ("URL") signifying a tokenization service provider capable of recovering plaintext of the tokenized biometric data; a template identifier and a universally unique identifier signifying a database that contains the biometric reference template; and the like. In some embodiments, the identifiers are within the reference template stored in the biometric reference template record. In those embodiments, the template generation circuit 114 digitally signs the tokenized biometric data and a second identifier signifying the tokenization service provider. An example of this biometric reference template record is shown in FIG. 4B, containing a plurality of OIDs within a single reference template in a biometric reference template record. In arrangements where the BSP is the TSP, a second identifier (either within the biometric reference template record or the reference template) signifies the tokenization schema used to tokenize the biometric data. In other embodiments, the template generation circuit 114 digitally signs both the biometric reference template record and the second identifier signifying the TSP that tokenized the biometric data. For example, the template generation circuit 114 may use SignedData cryptographic message syntax to generate a SignedData message, and may bind a second identifier signifying the TSP to the Signed-Data message. Identifying the tokenization schema on each biometric reference template record would facilitate interoperability in a system with multiple TSPs. An example method of generating the biometric reference template record is described below in method 200 of FIG. 2.

The template generation circuit 114 may also retrieve the raw biometric templates stored on in the raw biometric sample database 126 in order to process them using a different processing method and to replace the templates in the reference template database 122. The template generation circuit 114 can also receive a new biometric template sample, either to refine or replace an existing biometric reference template record. Upon receiving a biometric template sample and a user identifier, the template generation circuit 114 may check to see if the requesting identifier already exists on the database. If no entry exists, the template generation circuit 114 can create a new user identifier, tokenize the supplied biometric sample, and assign the biometric reference template record to the newly generated user identifier. If an entry does exist, the template generation circuit 114 may determine whether the biometric type of the supplied biometric template sample matches any existing biometric sample. The template generation circuit 114 can also then add the biometric template sample to the reference template. In some arrangements, the new biometric template sample will replace an existing biometric data string within the biometric reference template record. An example of replacing the reference template in the biometric reference template record is described below in method 500 of FIG. 5.

The authentication circuit 116 is structured to authenticate a provided biometric sample to a biometric reference template record in the database. The authentication circuit 116 is structured to process authentication requests for identification and verification (verification requests may include an identifier of a user from whom the biometric sample was captured). The authentication circuit 116 is structured to receive the authentication request from the customer computing system 106 over the network 108 and generate the corresponding instructions to authenticate the sample. For example, the authentication circuit 116 may receive a biometric sample of a fingerprint, along with the corresponding user identifier for a verification of the user identifier with the associated biometric reference template record in the database 122. The BSP authentication circuit 116 generates the corresponding instructions to retrieve the biometric reference template record on file for the user identifier. If no template exists for that user identifier, the authentication circuit 116 can provide a failed authentication value to the requesting entity, including a notification of the failed authentication or steps to initiate a user biometric system enrollment process. In some embodiments, the authentication circuit 116 may receive a biometric reference template record in addition to the biometric sample.

Upon retrieval of the stored biometric reference template record 124, the authentication circuit 116 can determine how to use the biometric reference template record to authenticate the biometric sample. In some arrangements, the authentication circuit 116 is able, without detokenizing the template, to determine whether the template has the same biometric type as the biometric sample. In other arrangements, the authentication circuit 116 must first detokenize the template, by submitting a detokenize request with the TSP computing system 104, before the determination can be made. If the template does not have the biometric data type similar to the sample, the authentication circuit 116 may reject authentication and can provide the requesting entity a list of the biometric data types that are stored in the template. In some embodiments, the authentication circuit 116 is structured to provide the requesting party with the biometric reference template record used for matching. The used template can be transmitted along with the authentication value to the requesting entity. This authentication process (verification and/or identification) is shown in greater detail in method 300 of FIG. 3.

In some embodiments where the BSP and the TSP are the same entity, the authentication circuit 116 can detokenize the entire biometric reference template record. This is achieved by first identifying the first OID that signifies that the data is tokenized and then by identifying the second OID to determine the tokenization schema used. For example, the biometric reference template record may contain three biometric types with an OID for each type and an OID indicating the tokenization method used to tokenize the entire string. The authentication circuit 116 identifies the tokenization method, detokenizes the entire string, and then uses the specific data string of the biometric type to compare to the biometric sample. In other arrangements, the authentication circuit 116 is able to identify and parse out from the biometric reference template record, the information string of the same biometric type as the provided sample.

The template management circuit 118 is structured to organize and retrieve stored biometric reference template records that are associated with the user enrolled at the BSP. The template management circuit 118 receives a generated template from the template generation circuit 114 to store in the reference template database 122. The template management circuit 118 interacts with the authentication circuit 116 to provide a specific template for verification or a plurality of templates for identification from the reference template database 122. In some embodiments, the template management circuit 118 receives a new biometric reference template record from the TSP computing system 104 to assign to the user enrolled at the BSP. In some arrangements, the template management circuit 118 facilitates the storage of the biometric reference template record in a public repository (e.g., a cloud, a blockchain, etc.) for a public/pointer-based authentication system, similar to method 600 and 606 described below in connection with FIG. 6.

In some arrangements, the template management circuit 118 is structured to generate and maintain event journal entries in a repository. The event journal entries are associated with a biometric reference template record and may relate to events regarding generation, authentication, and the like. The compliance of any authentication system as to its consistency and accuracy requirements is often ascertained by an audit trail in an event journal. Compliance can be validated internally by an organization or by an external third party. Independent third parties can validate compliance or issue a formal attestation report that can be made public. Mechanisms are in place to ensure the detection of a deletion, addition, modification, or similar action to an event entry. The event journal is attributable to authenticated sources and may be digitally signed (or protected by some other means) to meet these requirements. The event journal entries can include, for example: enrollment, enrollment failure, verification, verification failure, identification, identification, termination, addition, deletion, modification, injection, summary, and archive. The event journal record can also include information related to the biometric reference template record associated with the generated event journal record. For example, a "BiometricHeader" may be used to identify the user identifier or the biometric type involved in the generation of the event journal log. Additionally, just the tokenized data could be placed in the event journal log record with the additional identifiers, information, or metadata. In some arrangements, because of the tokenization of the information in the event journal log, the event journal log can be signed, time stamped, and stored in an accessible repository, for example a blockchain. The date and time in each event journal record definition would indicate when the record was created by the BSP computing system 102. Storage in a blockchain would allow auditing from authorized entities while being restricted through use of a private blockchain or using cryptography in a shared blockchain.

The biometric reference template record database 122 is structured to store the biometric reference template records and corresponding user identifiers for all of the users that have enrolled in the biometric authentication service with the BSP. The biometric reference template record database 122 can update or replace an existing biometric reference template record 124 with a new biometric reference template record when the user provides an additional biometric sample. The biometric reference template record database 122 provides the specific biometric reference template record 124 in response to a verification request for a user identifier, which may be analyzed to determine whether a specific biometric sample matches the specific biometric reference template record 124.

The raw biometric sample database 126 is structured to store, off of the network 108, the raw, detokenized biometric data for all the users stored in the BSP computing system 102. The raw biometric data is stored so that it can be reprocessed using a new processing method, if the need arises. For example, a specific first algorithm is used to tokenize and process all the raw biometric data. However, a second algorithm may be developed and preferred over the first method. The raw biometric data in the raw biometric sample database 126 is processed using the new second processing algorithm and replaces the corresponding biometric reference template records in the database with the new tokenized templates. For security purposes, the raw biometric sample database 126 can be stored off of networks and only accessed to add new raw biometric data to the database or to reprocess the raw data using a new algorithm, thereby preventing access through an outside attack.

The TSP computing system 104 includes a network interface circuit 130, a tokenization circuit 132, and a token vault 134. The TSP computing system 104 may, for example, include one or more servers each with one or more processors configured to execute instructions stored in a memory, send and receive data stored in the memory, and perform other operations to implement the financial services described herein associated with the processing modules, databases, and processes. In some embodiments, some or all of the TSP computing system 104 is managed by the BSP computing system 102.

The network interface circuit 130 is structured to facilitate operative communication between the TSP computing system 104 and other systems and devices over the network 108.

The tokenization circuit 132 is structured to organize and facilitate the tokenization (e.g., obfuscating the cleartext with a token) of any biometric data received. This includes tokenizing and detokenizing the reference templates in the biometric reference template records from the BSP computing system 102. In some arrangements, the tokenization circuit 132 may provide an OID with the tokenized biometric data returned to the BSP computing system 102 for inclusion in the biometric reference template record. For example, the OID could represent a TSP identifier, tokenization schema, or other information to assist the TSP computing system 104 in processing a tokenization request from the BSP computing system 102. In some arrangements, the BSP computing system 102 may transmit a detokenization request with the biometric reference template record to the TSP computing system 104. In other arrangements, the BSP computing system 102 may transmit a detokenization request with just the reference template in the biometric reference template record to the TSP computing system 104. In some arrangements, the tokenization circuit may examine an OID (e.g., either as a signed attribute or included in the template) with the biometric reference template record from the BSP computing system 102.

In one embodiment, the tokenization circuit 132 is structured to generate a token recovery service attribute, which can be included in a biometric reference template record to specify the parameters for recovering plaintext biometric data. In one embodiment, a token recovery service attribute is represented by a tokenRecoveryService information object of class ATTRIBUTE and is defined as:

tokenRecoveryService ATTRIBUTE::={
  WITH SYNTAX URI
  ID id-tokenRecoveryService
}

In an embodiment, the token recovery service attribute includes a URI query string that can be used to recover the plaintext data from a token using a TSP. The URI may be in the form of a URL that both identifies and locates the TSP resource capable of recovering plaintext from a given token. The attribute may support both Hypertext Transfer Protocol ("HTTP") and HTTP over Secure Sockets Layer ("HTTPS").

In an embodiment, the general syntax of the query string is:

?$token_1$=$value_1$&$account_2$=$userID_2$&$authenticator_3$=$password_3$ . . .

The information in this attribute uses the value of the token component of a biometric reference template record (or in some embodiments the reference template), and an account value registered by the TSP that uniquely identifies the user requesting detokenization of the token value, and the authenticator password or other secret shared by the user and the TSP that is needed to authenticate the access of that user to the detokenized token value. database that contains the reference template.

In an embodiment, the token component is a value of type Token, defined as:

Token::=OCTET STRING (SIZE (16))

A value of type userID is any type of user account identifier, and a value of password can be any string of octets, which may or may not contain structured data, needed to authenticate the user requesting access to the detokenized token.

A value of type Token can be used to uniquely determine the location of any tokenized value controlled by the TSP.

The token vault 134 is structured to store the tokenization schemas that the TSP has implemented to tokenize data. In some arrangements, the token vault 134 includes the plaintext data associated with the generated token.

The customer computing systems 106 include a network interface 136, a display 138, a biometric sensor 140, an input/output device 142, and a fob 144. The network interface 136 is structured to facilitate operative communication between the customer computing systems 106 and other systems and devices over the network 108. The customer computing systems 106 may include smartphones, tablet computing systems, laptop computing systems, desktop computing systems, PDAs, smart watches, smart glasses, tablets, etc.

The biometric sensor 140 is structured to read a fingerprint, voice print, or other biometric marker. Generally, the biometric sensor 140 is any technology type that supports the capture of a biometric. The biometric sensor 140 can be used to generate a biometric reference template or a biometric sample used for authentication.

The display 138 is structured to present authentication instructions and, if authenticated, provide information regarding account information, transaction information, and the like. The input/output device 142 is structured to receive input from the customer via the customer computing systems 106. The input/output device 142 is used to enter a user identifier or type in a password to provide additional authentication. Additionally, the input/output device 142 may be used to select a biometric type from a list of possible biometric authenticators for the customer to provide the biometric sample. For example, the customer may select to provide a fingerprint, voice, or video option. The input/output device 142 may include a keyboard, a mouse, a touchscreen, a biometric sensor (e.g., a fingerprint sensor), a microphone, a camera, etc. In some embodiments, the input/output device 142 is the same as the biometric sensor 140.

The fob 144 is structured to store a biometric reference template record. In one embodiment, the fob 144 is a hardware device including a processor and memory structured to store the biometric reference template record. Although the fob 144 is shown as being separate from the customer computing systems 106, in some embodiments, the fob 144 is integrated in the customer computing systems 106. For example, the fob 144 may be implemented via a secure element on a smartphone. If the authentication management is done properly, the fob biometric reference template record is the same biometric reference template record stored in the BSP computing system 102 for the user. The fob 144 may be provided by an entity operating the customer computing system 106. For example, the user could initiate an authentication request at a financial institution, provide a biometric sample that is authenticated by the BSP computing system 102, and present the fob 144 for matching with the BSP used biometric reference template record to provide an additional layer of authentication. The fob 144 biometric reference template record is updated whenever a new biometric reference template record is generated by the BSP. For example, if a new reference sample for the user is added the fob 144 is updated. The fob 144 biometric reference template record could be updated by accessing the most up to date template on a server and downloading it to the fob 144. In other embodiments, the fob 144 is automatically updated when the BSP "pushes" the updated biometric reference template record to the BSP computing system 102 and the user.

Figure 2:
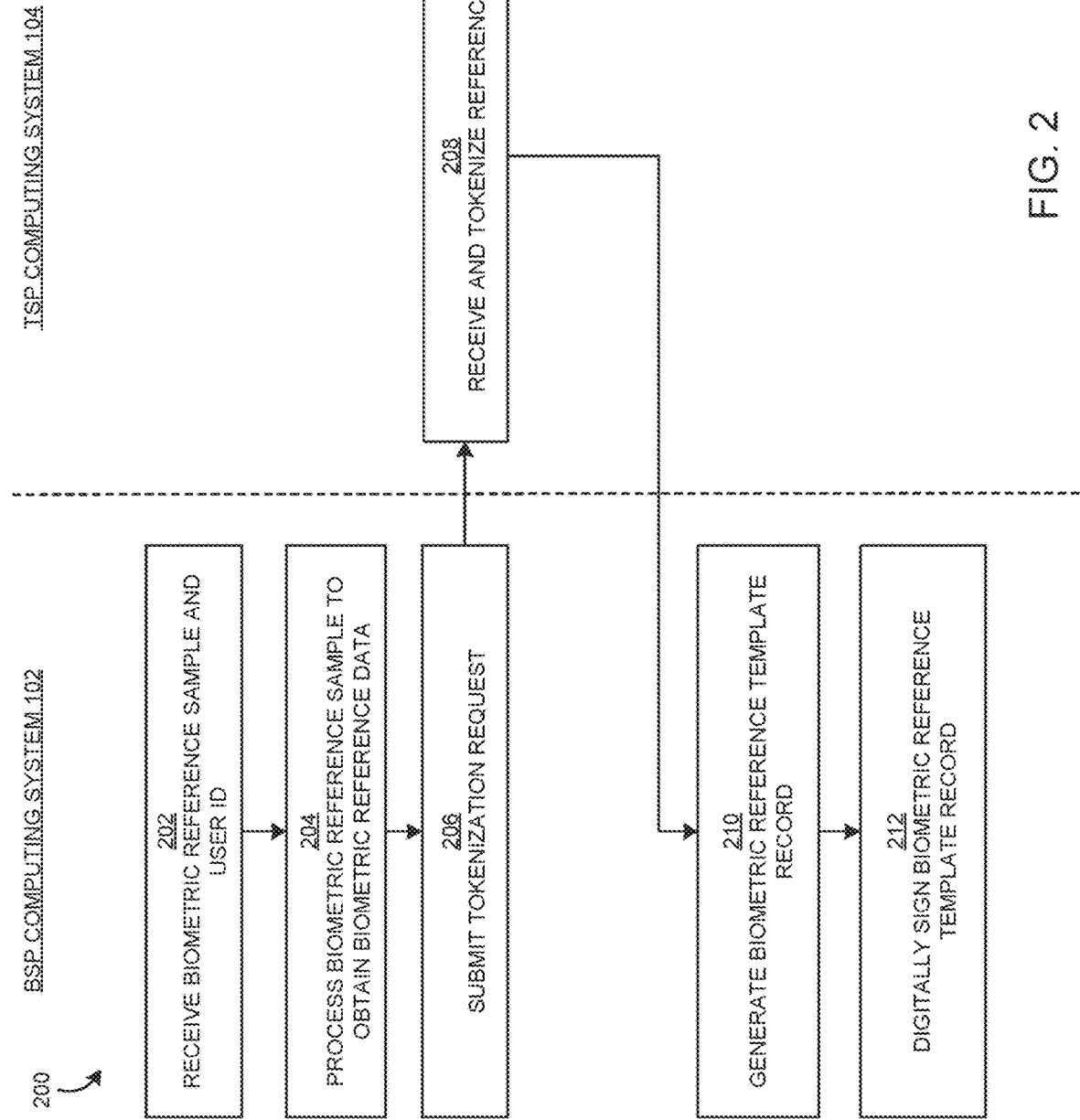
FIG. 2 is a flow diagram of a method of generating a biometric reference template record, according to an example embodiment.

Referring to FIG. 2, a flow diagram of a method 200 of generating a biometric reference template record from a biometric sample is shown, according to an example embodiment. The method 200 is shown in connection with a BSP and a TSP. For example, the BSP may be an entity that manages the BSP computing system 102 of FIG. 1. The TSP may be an entity that manages the TSP computing system 104 of FIG. 1. However, the method 200 may be similarly performed by other systems and devices.

The method 200 begins when a BSP computing system 102 receives a biometric reference sample and a user identifier at 202. The user identifier is associated with a user that is enrolling in the BSPs services. The enrollment process may include checking identification credentials (e.g., state issued driver's license, birth certificate, etc.) of the user to confirm the user's identity.

At 204, the BSP computing system 102 processes the provided biometric reference sample to generate the biometric data. At 206, the BSP computing system 102 transmits a tokenization request and the biometric data to a TSP computing system 104. At 208, the TSP computing receives the tokenization request, tokenizes the biometric data, and transmits the tokenized biometric data to the BSP computing system 102.

At 210 the BSP computing system 102 receives the tokenized biometric data and generates a reference template of the tokenized biometric data and a biometric reference template record. The biometric reference template record can include a template identifier uniquely identifying the biometric reference template, the reference template, and a first identifier signifying that the biometric reference template includes tokenized biometric data. The template identifier is associated with the user identifier and may be used for locating the biometric reference template records in the database. In some arrangements, an identifier is stored with the biometric reference template record along with the reference template. An example of this biometric reference template record is shown in FIG. 4A, containing a plurality of OIDs and a reference template within a single biometric reference template record.

At 212, the BSP computing system digitally signs the biometric reference template record. In some arrangements, the digital signing is performed using SignedData cryptographic message syntax to generate a SignedData message. Additional identifiers (e.g., OIDs) may be bound to the message including the biometric reference template record. In some embodiments, the digital signing is performed on a hash of the biometric reference template record, allowing the biometric reference template record to be authenticated with the hash while limiting processing issues. In some embodiments, the template generation circuit 114 digitally signs the reference template and a second identifier signifying the tokenization service provider, the result being included in the biometric reference template record. In other embodiments, the template generation circuit 114 digitally signs both the biometric reference template record and the second identifier signifying the TSP that tokenized the biometric data. For example, the template generation circuit 114 may use SignedData cryptographic message syntax to generate a SignedData message, and may bind a second identifier signifying the TSP to the SignedData message. Identifying the tokenization schema on each biometric reference template record would facilitate interoperability in a system with multiple TSPs. In some arrangements, the enrollment and generation of a biometric reference template record generates an event journal entry into a repository.

Figure 3:
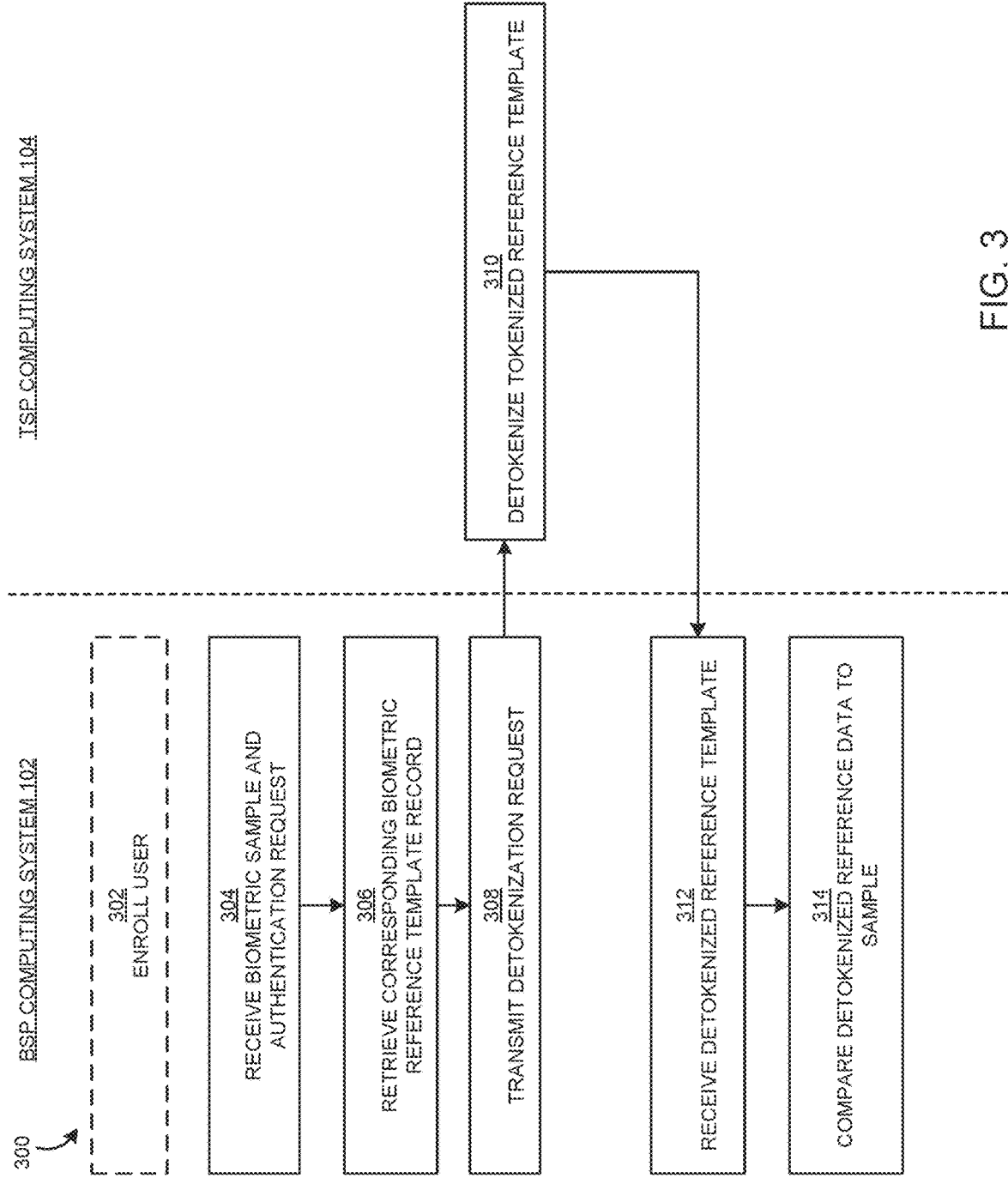
FIG. 3 is a flow diagram of a method of authenticating a biometric sample, according to an example embodiment.

Referring to FIG. 3, a flow diagram of a method 300 of transmitting a biometric sample to a BSP for authentication is shown, according to an example embodiment. The method 300 is shown in connection with a BSP and a TSP. For example, the BSP may be an entity that manages the BSP computing system 102 of FIG. 1. The TSP may be an entity that manages the TSP computing system 104 of FIG. 1. However, the method 300 may be similarly performed by other systems and devices.

The method 300 begins when a user (e.g., a customer of a BSP) enrolls in a biometric system to create a biometric reference template that can be used for subsequent biometric matching at 302. This enrollment process can be similar to that described in connection with the method 200 of FIG. 2.

At 304, the BSP computing system 102 receives an authentication request. The authentication request includes a biometric sample and, if the request is for identity verification, an identifier of the user (a user identifier). In some embodiments, the user may capture the biometric data sample using a biometric sensor on the user's computing device and submit the sample with the user identifier to the BSP. In other arrangements, the request is initiated by an employee of the BSP entering data into a computing system (e.g., an employee terminal connected to the server of the BSP) during a person-to-person interaction. For example, the user may walk into a branch location of the BSP and initiate a service requiring biometric authentication with the employee. In some embodiments, the user or requesting entity could also submit a biometric reference template record stored in a database within the BSP in order to provide an additional level of authentication and verification.

At 306, the BSP determines what biometric reference template record(s) are needed to complete the authentication request based on the type of authentication request (e.g., verification or identification). If a verification request is received, the BSP computing system 102 locates and retrieves the biometric reference template record associated with the user identifier from the BSP database. In some embodiments, after receiving the request, the BSP determines if the user identifier has a biometric reference template record containing the biometric type similar to the biometric type of the biometric sample. For example, the BSP may receive a biometric sample of a fingerprint and determine that while a biometric reference template record exists for the user identifier, the biometric reference template record does not have a biometric type of a fingerprint. In some embodiments, the BSP rejects the authentication with details regarding a missing biometric reference template record or biometric data type within the biometric reference template record for that user identifier.

At 306, if an identification request is received, the BSP determines how many biometric reference template records must be reviewed to find a match. For example, if the identification request biometric sample is a fingerprint, the BSP computing system may retrieve only those biometric reference template records that include a biometric type identifier associated with a fingerprint scan. In the simplest case the BSP computing system 102 stops checking templates (e.g., step 308-312 of detokenizing and matching) as soon as the first matching biometric reference template record is located, returning the identity associated with that matching biometric reference template record as the identity of the user. In other arrangements, the BSP computing system 102 may compare the user's biometric sample to all biometric reference template records in the system, in order to verify that the user does not match more than one. In the case of multiple matches, the BSP computing system 102 may identify the user as the owner of the biometric reference template record with the closest match (e.g., correspondence) to the sample.

At 308, the BSP computing system 102 submits a detokenization request for the reference template in the biometric reference template record to the TSP computing system 104. In some embodiments, the biometric reference template record may contain multiple OIDs, each OID including a plurality of information including one that includes information for submitting a request for detokenizing the tokenized data. In some arrangements, the BSP transmits the entire biometric reference template record to the TSP computing system 104. In other arrangements, just the reference template, which contains the tokenized biometric data, is transmitted to the TSP computing system 104.

At 310, the TSP computing system 104 detokenizes the reference template to be usable in a matching or processing algorithm between the biometric reference template record that contained the reference template and the supplied biometric sample. In some embodiments, the biometric reference template record may contain multiple OIDs, each OID including a plurality of information regarding how the TSP boringly tokenized the data. For example, the OID may indicate a biometric type, the tokenization method used for that part of the biometric reference template record, a tokenized string of the biometric data, a processing algorithm for the detokenized biometric data, and the like.

At 312, the BSP computing system 102 received the detokenized reference template, either alone or included in the biometric reference template record. At 314 the BSP computing system compares the detokenized reference template to the received biometric sample using a biometric processing algorithm or a biometric matching algorithm. The matching algorithm measures the similarity of the sample and the detokenized biometric data in the reference template. Each comparison of a sample with the reference template results yield a score, which is a numeric value indicating how closely the sample and template match. Generally, the score is related to a given confidence of positive identification for the biometric subject which can be factored into the overall rules and risk policy for the BSP's (or financial institution using the BSP) authorization policy. The method of computing the score can differ among biometric technologies, but typical methods include distance metrics, probabilistic measures, and normalized correlation. If the score is in accordance with the desired score and confidence interval, a binary decision value, regarding whether the claimant is who they claim to be, is generated. In an identification authentication request, the score may incorporate account additional indexing or binning information about the user sample in order to focus the computations of the matching process to biometric reference template records that are most likely to match the user sample.

In some embodiments at 314, the biometric sample contains raw biometric data that is processed using the same algorithm that is used by the similar biometric type in the biometric reference template record. In other embodiments, the detokenized reference template is processed to transform the biometric data back into raw biometric data for comparison to the biometric sample, which contains raw biometric data. The BSP computing system 102 may generate an authentication value that is at least responsive to the comparison of the biometric reference template record and the biometric sample. The authentication value can be a binary value indicating a match or a non-match. In some embodiments, the BSP can provide additional details or comments regarding a matched or failed authentication value (e.g., a confidence value). In some arrangements, the BSP may also transmit the biometric reference template record that the BSP used to compare to the biometric sample for additional authentication by the party that requested the authentication. In some arrangements, the authentication request, authentication result, and other steps of method 300 generate an event journal entry into a repository.

FIG. 4A is an illustration of a tokenized string of biometric data and identifiers in a biometric reference template record 400, according to an example embodiment. In this arrangement, the biometric reference template record 400 includes a plurality of OIDs or identifiers 402 and the reference template 404. The identifiers 402 include a biometric type identifier 406, a tokenization method identifier 408, a biometric processing algorithm identifier 410 and a BSP access and request identifier 412. The reference template 404 contains tokenized biometric data. In some arrangements, these OIDs are stored as attributes of the digital signature.

The biometric type identifier 406 is an alphanumeric representation of the biometric type of the subsequent string of data. In some embodiments, the biometric type identifier 406 can be used to parse out a specific section of the reference template 404 to, for example, match with a sample or to replace with a newer biometric reference template of that biometric type. The biometric type identifier 406 can be, for example, a fingerprint, a retina scan, a voice profile, a signature, etc. In some embodiments, the biometric type includes a biometric reference template record identifier that can signal to a BSP, or other entity, that the data string is a biometric reference template record.

The tokenization method identifier 408 is an alphanumeric representation of the tokenization method used to tokenize the reference template 404. The tokenization method can be any algorithm, matching system, or other form of processing the private biometric data such that it becomes anonymous and unusable for biometric matching to entities that are not authorized to have access. In some embodiments, the tokenization method identifier 408 indicates the TSP provider that completed the tokenization. For example, the tokenization method identifier 408 may include a URL signifying a tokenization service provider capable of recovering plaintext of the tokenized biometric data. In some embodiments, where the TSP and the BSP are the same entity, this OID can represent a token method used to tokenize the data.

The biometric processing identifier 410 is an alphanumeric representation of the processing method used for processing the raw biometric data from the biometric sensors into some string of useable data. Similar to the tokenization method, there are many ways in which the raw biometrics can be processed. BSPs can have multiple processing algorithms that can change over time due to a change in technology used or in the ownership of the BSP. In some arrangements, there may be multiple biometric processing identifiers 410 and biometric reference template record 400 for a single raw biometric sample. For example, there may be multiple different biometric reader vendors, such that one biometric reader may not work the same (e.g., match with the processed algorithm) at all in some locations, even when the user is authorized. Consequently, multiple biometric reference template records 400, or multiple reference templates 404 may be generated with a biometric reference template record 400, to allow for matching using vendor specific hardware, biometric processing algorithms, and biometric matching methods.

The BSP access and request identifier 412 can be a URL indicating the location from which the biometric reference template record 400 may be retrieved. In some embodiments, a financial institution is provided with a biometric reference template record by a user (e.g., on a fob) and the BSP access and request identifier 412 within the biometric reference template record 400 provided by the user allows the financial institution to easily use the embedded link to start the authentication process. In some embodiments, the link may require a username and password login before the request for authentication can be completed.

The reference template 404 is an alphanumeric representation of the processed biometric data in tokenized form. In the tokenized form, the biometric data is private and anonymous to entities that lack the requisite authorization to view and/or use the biometric data. In some arrangements, the reference template 404 includes OIDs or identifiers, as described below in FIG. 4B.

FIG. 4B is an illustration of a tokenized string of biometric data and identifiers in a reference template, according to an example embodiment. In this arrangement, the reference template 420 includes a plurality of OIDs or identifiers and the tokenized biometric data 416. The identifiers include a biometric type identifier 406, a tokenization method identifier 408, a biometric processing algorithm identifier 410 and a TSP access and request identifier 418. In some arrangements, these OIDs are stored as attributes of the digital signature. In other arrangements, such as FIG. 4A, the identifiers are only stored in the biometric reference template record that contains the reference template 420 that just includes the tokenized biometric data 416.

The biometric type identifier 406, the tokenization method identifier 408, and the biometric processing algorithm identifier 410 are similar to the identifiers of FIG. 4A. The TSP access and request identifier 418 can be a URL indicating the location from which a detokenized, plaintext version of the tokenized biometric data 416 may be retrieved. The tokenized biometric data 416 is an alphanumeric representation of the processed biometric data in tokenized form. In the tokenized form, the biometric data is private and anonymous to entities that lack the requisite authorization to view and/or use the biometric data. Possible tokenization schemas include, for example, a token output that is identical to the processed biometrics in structure and character set but not value; a token output composed of alphabetic and numeric characters of varying lengths, generated using a specific algorithm; a token output identical to the original data except for a character string indicating it is a token; and a token output that is a reference ID to a location in a lookup database containing the corresponding processed biometric data.

Figure 5:
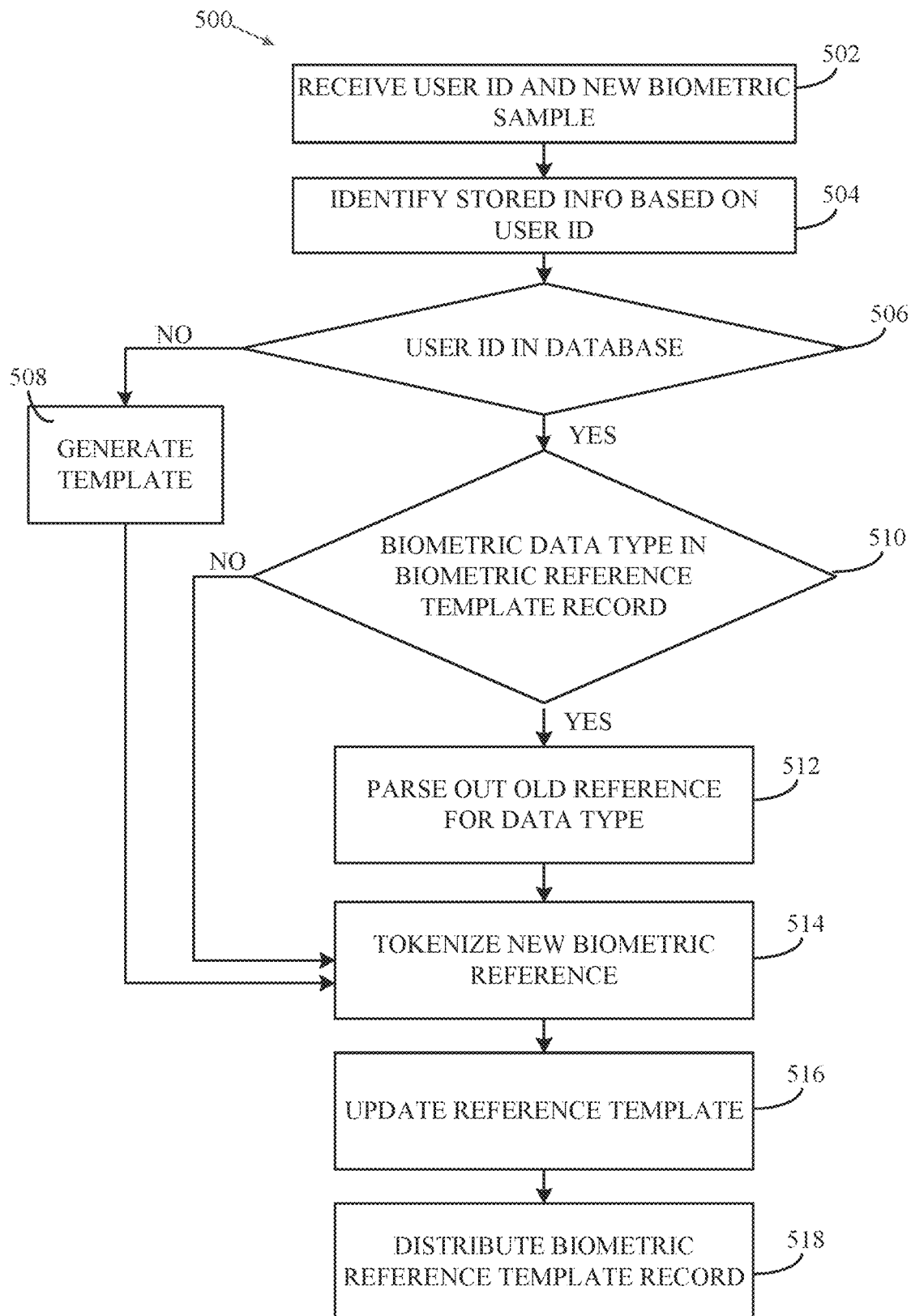
FIG. 5 is a flow diagram of a method of altering a biometric reference template record, according to an example embodiment.

Referring to FIG. 5, a flow diagram of a method 500 for a BSP computing system 102 to update a biometric reference template record is shown, according to an example embodiment. The method 500 is shown in connection with a BSP receiving, from an authorized party, a new biometric sample to add to the biometric reference template record of a user identifier. For example, the outside party may be a user updating biometric information at a BSP. However, the method 500 may be similarly performed by other systems and devices.

The method 500 begins when the BSP computing system 102 receives a new biometric sample from an authorized party to be added to or replace an existing biometric data type in the biometric reference template record at 502. The request can be to create a new database entry, supplying the user identifier and other identifying information along with biometric sample(s) that will be used to generate a biometric reference template record. The request may include adding a new biometric sample of a new biometric type to an existing biometric reference template record. In one embodiment, the request includes the user identifier and the new biometric sample. Another request may include replacing an existing biometric sample with a new biometric sample. In one embodiment, the request includes the user identifier and the new version of the biometric sample.

At 504, the BSP uses the provided user identifier to determine where to locate the information the BSP has stored in one of the databases. The BSP could also determine whether or not the requesting party has the proper credentials to make the request.

At 506, the BSP determines if the user identifier is stored on the database. If the user identifier is not in the database, then the BSP can create a new profile for the information, at 508, and generate and associate the biometric reference template record with the account. In these instances, the BSP may require additional identifying information to be provided before generating the new user identifier. In some embodiments, the BSP may compare the biometric sample to the biometric data stored on the BSP servers to ensure that no duplicate user accounts would be generated.

If the user has a user identifier in the database, at 510, the retrieved biometric reference template record is examined to determine if the biometric sample is of a new or existing biometric data type. This can be accomplished by examining a biometric type OID or identifier in the biometric reference template record. If the provided biometric sample is of a new biometric data type, then the new biometric sample is tokenized by a TSP and is added to the existing reference template in the biometric reference template record, at 514. For example, the user identifier John Smith can have a biometric reference template record that contains a voice profile and a fingerprint scan, and the biometric template sample is a scan of John Smith's retina. The retina scan will be tokenized and added to the biometric reference template record.

If the retrieved biometric reference template record already has the existing biometric type, at 512, the section of the reference template in the biometric reference template record corresponding to the old biometric data type will be parsed out and replaced with a tokenized version of the new biometric sample. In some embodiments, the reference template must be detokenized by a TSP before the old biometric type can be parsed out and replaced with the new biometric data. At 514, the biometric data is added to the existing reference template. In some arrangements, the new biometric sample can be individually tokenized and then added into the existing string of the reference template in the biometric reference template record. In some arrangements, the biometric sample must be added to the detokenized reference template, and then the resulting new string of data is tokenized to generate the new biometric reference template record.

At 516, the new biometric reference template record is added to the database in place of the old biometric reference template record. At 518, the new biometric reference template record is distributed to the relevant and interested entities. In some embodiments, the BSP may wait until it receives an authentication before it supplies the new biometric reference template record to the requesting party. In some arrangements, the BSP computing system 102 may push the new biometric reference template record to all of the subscribers of the BSP's authentication service. In some embodiments, the BSP may also push the new biometric reference template record to the individual associated with the user identifier. For example, the user may have a fob used to provide additional authentication and the fob would automatically update, or update upon log in, the new biometric reference template record when in range of the network.

Figure 6:
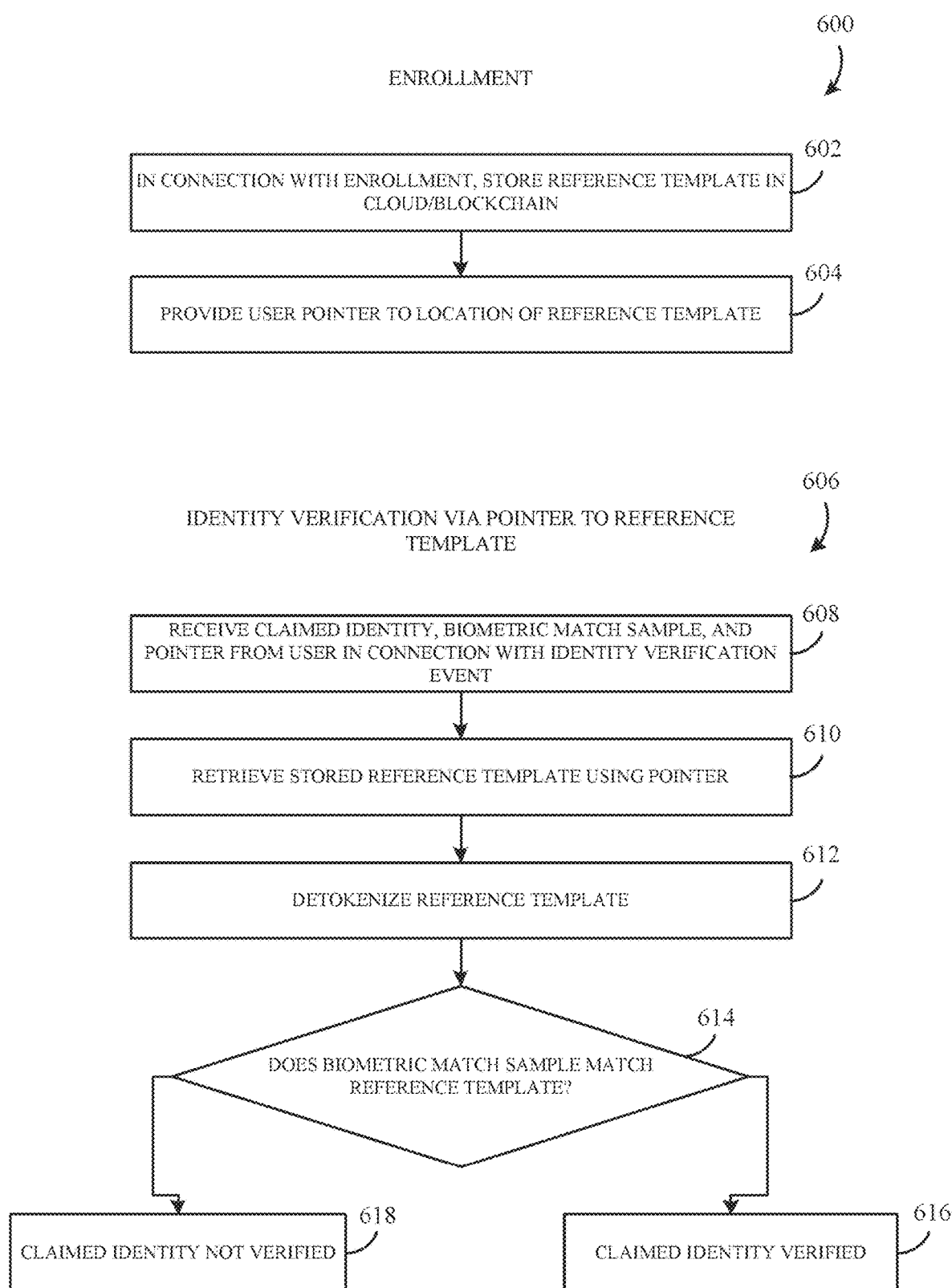
FIG. 6 is a flow diagram of methods of authenticating a biometric sample in public/pointer-based authentication system, according to an example embodiment.

Referring to FIG. 6, a flow diagram of a method of enrollment 600 and a method of identity verification 604 for a BSP computing system 102 is shown, according to an example embodiment. The enrollment method 600 is shown in connection with a BSP computing system 102 receiving from an authorized party, a biometric sample to add to the biometric reference template record associated with a pointer. The identity verification method 604 is shown in connection with a BSP computing system 102 receiving an verification request with the associated pointer. However, the methods 600 and 604 may be similarly performed by other systems and devices.

Method 600 begins when a user enrolls with the BSP at 602. The enrollment process generates a reference template (or biometric reference template record containing the reference template) that contains the tokenized biometric data. The BSP may store the user's reference template in a cloud or blockchain system. At 604, the BSP computing system 103 generates and provides a pointer (e.g., in the form of a URI) to the location of the user's template. The pointer can be used by the user for subsequent identity verification. For example, a user could enroll in a biometric service managed by a financial institution. The financial institution may store the user's reference template in a cloud or blockchain system and generate a pointer (e.g., in the form of a URI) to the location of the user's template. The financial institution provides the pointer to the user to allow the user to provide identification to a relying party. The enrollment process may be similar to method 200 of FIG. 2 and may include checking identification credentials (e.g., state issued driver's license, birth certificate, etc.) of the user to confirm the user's identity.

Subsequent to enrollment, method 606 begins when the user provides identification (e.g., an account and associated information for the financial institution), a biometric match sample, and the pointer to the biometric reference template record to a relying party. For example, the user could engage in a transaction at a retailer and provide the pointer and biometric sample to the retailer to initiate the transaction. At 608, the BSP computing system 102 receives the claimed identity, the biometric match sample, and a pointer from the user in connection with an identity verification event. For example, the retailer could send this information through a point-of-sale interface to the financial institution associated with a BSP/TSP service for verification of the identity and approval of the transaction amount (e.g., there are sufficient funds in the user's account). In some embodiments, the sample is tokenized by the retailer at point-of-sale or through an application on a user device, thereby allowing the user to not expose their biometric sample to the retailer.

At 610 the BSP computing system 102 retrieves the stored reference template, containing the tokenized biometric data, associated with the claimed identity. At 612, the BSP computing system 102 detokenizes the tokenized biometric data within the reference template. In some arrangements, the BSP computing system 102 must submit a detokenization request for the reference template to the TSP computing system 104. In other arrangements where the TSP and BSP are the same entity, the BSP computing system 102 detokenizes the reference template in-house.

At 614, the BSP computing 102 matches the detokenized biometric data contained in the reference template to the biometric match sample. The matching algorithm measures the similarity of the sample and the detokenized biometric data in the reference template. Each comparison of a sample with the reference template results yield a score, which is a numeric value indicating how closely the sample and template match. Generally, the score is related to a given confidence of positive identification for the biometric subject which can be factored into the overall rules and risk policy for the BSP's (or financial institution using the BSP) authorization policy. If the score is above the threshold for a match, at 616, the claimed identity is verified. If the score is below the threshold for a match, at 618, the claimed identity is not verified. For example, the retailer that submitted the information through the point-of-sale interface to the financial institution associated with the BSP/TSP service for verification may receive from the financial institution a signed indication of the match results and transaction approval. Through method 606, the retailer would never need to enroll the user in a biometric system to benefit from biometric authentication and the retailer could log all of the pointers to the signed BSP/TSP match result to have on hand for a repudiation defense.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method, comprising:
receiving, by a computing system, an update biometric reference sample and a user identifier, the user identifier uniquely identifying a user from whom the update biometric reference sample was captured;
retrieving, by the computing system, a previous biometric reference template record in a storage location based on the user identifier, the previous biometric reference template record comprising:
a template record identifier uniquely identifying the previous biometric reference template record, the previous biometric reference template record being associated with the user identifier, and
a previous biometric reference template generated using a previous biometric reference sample;
comparing, by the computing system, the update biometric reference sample to the previous biometric reference template;
responsive to determining that a biometric data type of the update biometric reference sample is different than that of the previous biometric reference template, generating, by the computing system, an update biometric reference template, the update biometric reference template comprising the update biometric reference sample and the previous biometric reference template;
digitally signing, by the computing system, the update biometric reference template to generate a digitally signed message;
tokenizing, by the computing system, the update biometric reference sample using a first tokenization schema;
binding, by the computing system, a first identifier to the digitally signed message via an attribute of the digitally signed message, the first identifier identifying that the update biometric reference template comprises a tokenized biometric reference sample; and
binding, by the computing system, a second identifier to the digitally signed message via the attribute of the digitally signed message, the second identifier identifying the first tokenization schema, wherein the attribute comprises a first uniform resource identifier query string, the first uniform resource identifier query string comprising a first uniform resource locator identifying a first tokenization service provider capable of recovering the update biometric reference sample from the tokenized update biometric reference sample.

2. The method of claim 1, further comprising:
responsive to determining that the biometric data type of the update biometric reference sample is the same as at least a portion of the previous biometric reference template, parsing out the portion of the previous biometric reference template, wherein the update biometric reference sample replaces the parsed-out portion of the previous biometric reference template.

3. The method of claim 1, wherein comparing the update biometric reference sample to the previous biometric reference template comprises examining a biometric type object identifier (OID) in the previous biometric reference template record.

4. The method of claim 1, further comprising generating, by the computing system, an update biometric reference template record, the update biometric reference template record comprising:
   an update biometric reference template record identifier uniquely identifying the update biometric reference template record, the update biometric reference template record identifier being associated with the user identifier, and
   the update biometric reference template.

5. The method of claim 4, further comprising:
   receiving, by the computing system, a biometric authentication sample and the user identifier;
   identifying, by the computing system, the update biometric reference template record identifier associated with the user identifier;
   retrieving, by the computing system, the update biometric reference template record associated with the update biometric reference template record identifier;
   comparing, by the computing system, the update biometric reference sample to the biometric authentication sample; and
   generating, by the computing system, a verification value, wherein the verification value is related to the comparison of the update biometric reference sample to the biometric authentication sample.

6. The method of claim 5, further comprising responsive to the generation of the verification value, distributing the update biometric reference template record to a plurality of users.

7. The method of claim 1, wherein the attribute further comprises a template identifier and a universally unique identifier, the universally unique identifier identifying a storage location that contains a update biometric reference template record that comprises the update biometric reference template.

8. A non-transitory computer readable media having computer-executable instructions embodied therein that, when executed by a computing system, causes the computing system to perform operations for updating a biometric reference template, the operations comprising:
   receiving an update biometric reference sample and a user identifier, the user identifier uniquely identifying a user from whom the update biometric reference sample was captured;
   retrieving a previous biometric reference template record in a storage location based on the user identifier, the previous biometric reference template record comprising:
      a template record identifier uniquely identifying the previous biometric reference template record, the previous biometric reference template record being associated with the user identifier, and
      a previous biometric reference template generated using a previous biometric reference sample;
   comparing the update biometric reference sample to the previous biometric reference template;
   responsive to determining that a biometric data type of the update biometric reference sample is different than that of the previous biometric reference template, generating an update biometric reference template, the update biometric reference template comprising the update biometric reference sample and the previous biometric reference template;
   digitally signing the update biometric reference template to generate a digitally signed message;
   tokenizing the update biometric reference sample using a first tokenization schema;
   binding a first identifier to the digitally signed message via an attribute of the digitally signed message, the first identifier identifying that the update biometric reference template comprises a tokenized biometric reference sample; and
   binding a second identifier to the digitally signed message via the attribute of the digitally signed message, the second identifier identifying the first tokenization schema, wherein the attribute comprises a first uniform resource identifier query string, the first uniform resource identifier query string comprising a first uniform resource locator identifying a first tokenization service provider capable of recovering the update biometric reference sample from the tokenized update biometric reference sample.

9. The computer readable media of claim 8, the operations further comprising:
   responsive to determining that the biometric data type of the update biometric reference sample is the same as at least a portion of the previous biometric reference template, parsing out the portion of the previous biometric reference template,
   wherein the update biometric reference sample replaces the parsed-out portion of the previous biometric reference template.

10. A system, comprising:
   a storage location comprising a plurality of biometric reference templates containing biometric reference samples;
   a server system, the server system comprising a processor and instructions stored in non-transitory machine-readable media, the instructions configured to cause the server system to:
      receive an update biometric reference sample and a user identifier, the user identifier uniquely identifying a user from whom the update biometric reference sample was captured;
      retrieve a previous biometric reference template record in a storage location based on the user identifier, the previous biometric reference template record comprising:
         a template record identifier uniquely identifying the previous biometric reference template record, the previous biometric reference template record being associated with the user identifier, and
         a previous biometric reference template generated using a previous biometric reference sample;
      compare the update biometric reference sample to the previous biometric reference template;
      responsive to determining that a biometric data type of the update biometric reference sample is different than that of the previous biometric reference template, generate an update biometric reference template, the update biometric reference template comprising the update biometric reference sample and the previous biometric reference template;
      digitally sign the update biometric reference template to generate a digitally signed message;

tokenize the update biometric reference sample using a first tokenization schema;

bind a first identifier to the digitally signed message via an attribute of the digitally signed message, the first identifier identifying that the update biometric reference template comprises a tokenized biometric reference sample; and bind a second identifier to the digitally signed message via the attribute of the digitally signed message, the second identifier identifying the first tokenization schema, wherein the attribute comprises a first uniform resource identifier query string, the first uniform resource identifier query string comprising a first uniform resource locator identifying a first tokenization service provider capable of recovering the update biometric reference sample from the tokenized update biometric reference sample.

11. The system of claim 10, the instructions further configured to cause the server system to:

responsive to determining that the biometric data type of the update biometric reference sample is the same as at least a portion of the previous biometric reference template, parse out the portion of the previous biometric reference template, wherein the update biometric reference sample replaces the parsed-out portion of the previous biometric reference template.

12. The system of claim 10, wherein comparing the update biometric reference sample to the previous biometric reference template comprises examining a biometric type object identifier (OID) in the previous biometric reference template record.

13. The system of claim 10, the instructions further configured to generate an update biometric reference template record, the update biometric reference template record comprising:

an update biometric reference template record identifier uniquely identifying the update biometric reference template record, the update biometric reference template record identifier being associated with the user identifier, and the update biometric reference template.

14. The system of claim 13, the instructions further configured to cause the server system to:

receive a biometric authentication sample and the user identifier;

identify the update biometric reference template record identifier associated with the user identifier;

retrieve the update biometric reference template record associated with the update biometric reference template record identifier;

compare the update biometric reference sample to the biometric authentication sample; and generate a verification value, wherein the verification value is related to the comparison of the update biometric reference sample to the biometric authentication sample.

15. The system of claim 14, the instructions further configured to cause the server system to, responsive to the generation of the verification value, distribute the update biometric reference template record to a plurality of users.

16. The system of claim 10, wherein the attribute further comprises a template identifier and a universally unique identifier, the universally unique identifier identifying a storage location that contains a update biometric reference template record that comprises the update biometric reference template.

* * * * *